E. J. GUAY.
MACHINE FOR FORMING AND ELECTRICALLY WELDING TUBES.
APPLICATION FILED JAN. 19, 1911.

1,022,025.

Patented Apr. 2, 1912.
7 SHEETS—SHEET 1.

Fig. 1.

Witnesses
Irving E. Steus
J. Ellis Glen

Inventor,
Emile J. Guay,
by Albert G. Davis
Att'y

E. J. GUAY.
MACHINE FOR FORMING AND ELECTRICALLY WELDING TUBES.
APPLICATION FILED JAN. 19, 1911.

1,022,025.

Patented Apr. 2, 1912.
7 SHEETS—SHEET 2.

Fig. 2.

Witnesses:

Inventor,
Emile J. Guay,
by
Att'y.

E. J. GUAY.
MACHINE FOR FORMING AND ELECTRICALLY WELDING TUBES.
APPLICATION FILED JAN. 19, 1911.

1,022,025.

Patented Apr. 2, 1912.

Witnesses:

Inventor,
Emile J. Guay,
by
Att'y.

E. J. GUAY.
MACHINE FOR FORMING AND ELECTRICALLY WELDING TUBES.
APPLICATION FILED JAN. 19, 1911.

1,022,025.

Patented Apr. 2, 1912.

Witnesses:
Irving E. Steers
J. Ellis Glen

Inventor,
Emile J. Guay,
by Albert H. Davis
Att'y.

UNITED STATES PATENT OFFICE.

EMILE J. GUAY, OF LYNN, MASSACHUSETTS, ASSIGNOR TO GENERAL ELECTRIC COMPANY, A CORPORATION OF NEW YORK.

MACHINE FOR FORMING AND ELECTRICALLY WELDING TUBES.

1,022,025.  Specification of Letters Patent.  Patented Apr. 2, 1912.

Application filed January 19, 1911. Serial No. 603,443.

*To all whom it may concern:*

Be it known that I, EMILE J. GUAY, a citizen of the United States, residing at Lynn, county of Essex, State of Massachusetts, have invented certain new and useful Improvements in Machines for Forming and Electrically Welding Tubes, of which the following is a specification.

This invention relates to mechanism for making metallic tubes by folding a flat sheet of metal around a mandrel and securing the meeting edges together.

The object of the present invention is to provide mechanism which will effect these operations speedily and economically, using compressed air to operate the folding mechanism, and electric current for welding the edges of the sheet together. The sheet is laid above open jaws which in closing fold said sheet around a mandrel, which forms one terminal of an electric circuit. A roller is then run along the joint, and as said roller forms the other terminal of said circuit, the joint in the sheet is electrically welded by reason of the heat of said current and the pressure exerted by said roller.

In the accompanying drawings, forming part of this specification, and in which like parts are represented by like reference numerals.

Figure 8:
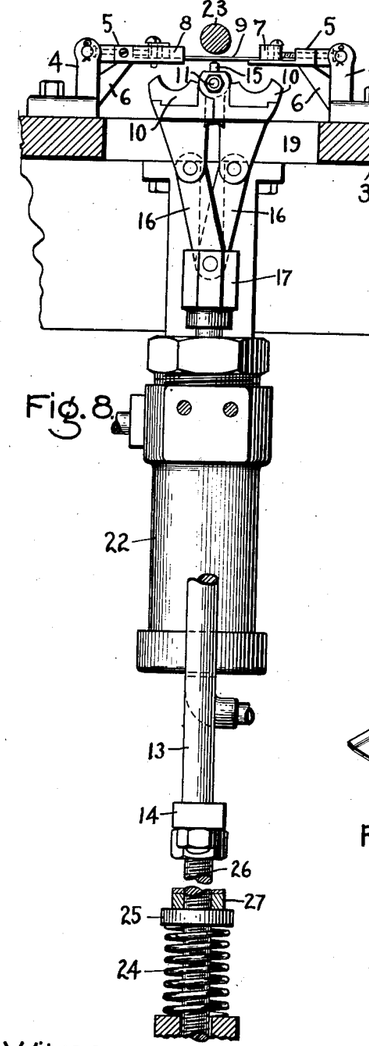
Fig. 8 is a cross section, showing the forming jaws open, and the blank resting on its supports just above them.
Figure 9:
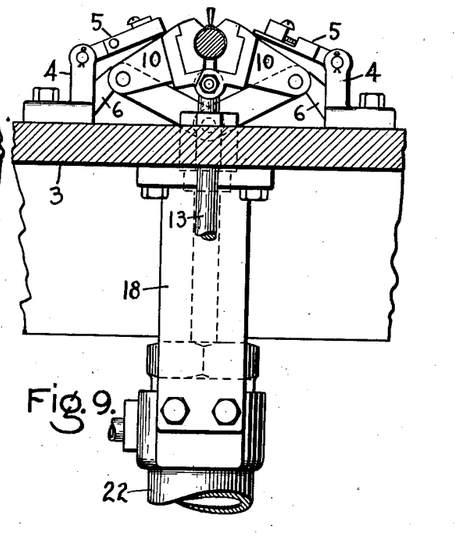
Fig. 9 is a cross section showing said jaws closed.
Figures 10, 11:
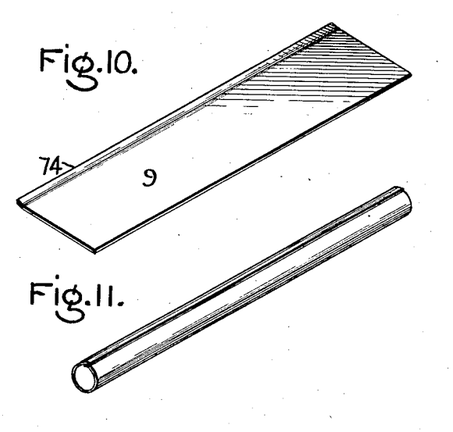
Fig. 10 shows the sheet metal blank.
Fig. 11 shows the completed tube.
Figure 12:
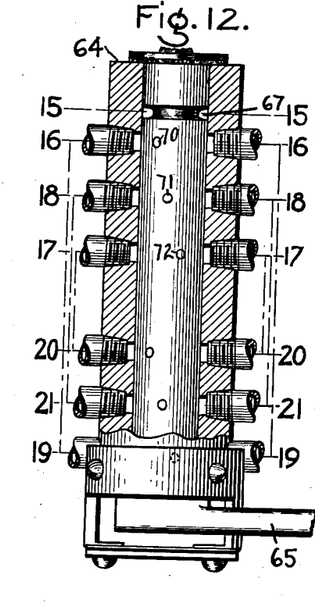
Fig. 12 is a longitudinal section of the valve which controls the pipes conveying compressed air to the various operating cylinders.
Figure 13:
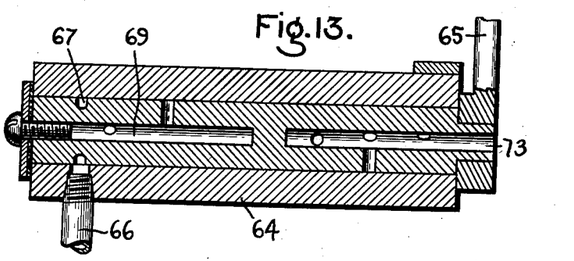
Fig. 13 is also a longitudinal section of said valve.
Figure 14:
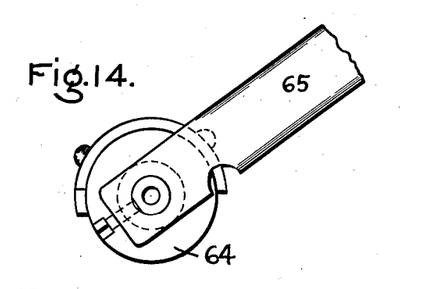
Fig. 14 is a bottom plan view of said valve.

The frame of the machine comprises stout legs 1 and crossbars 2 supporting a rigid bed plate 3 preferably of cast iron. On this bed plate are two pairs of short standards 4, and to each pair is hinged a flat plate 5, supported normally in a horizontal position by lugs 6 projecting from said standards underneath said plates. A longitudinal gage strip 7 is secured to each plate, said strips being adjustable toward and away from each other by means of suitable set screws. At one end of one plate is a stop 8. These plates serve to support the sheet 9 of sheet metal which is to be made into a tube; the strips 7 and the stop 8 being adjusted to locate the sheet properly with reference to the folding jaws. Said jaws 10 are hinged to a common pintle or arbor 11 extending longitudinally beneath the middle of the sheet 9 and supported in bushings 12 on the upper ends of rods 13 which pass down through holes in the bed plate and are attached to a cross head 14. On the upper side of each bushing is a short stud 15 adapted to bear against the underside of the sheet 9. Each jaw 10 is connected by a link 16 to a cross head 17 sliding in upright guides 18 secured to the underside of the bed plate: which is provided with a slot 19 for enabling the links to work freely. The cross head is attached to the upper end of a piston rod 20, whose piston 21 works in an upright cylinder 22 supported from the lower ends of the guides 18, and serves to actuate the jaws 10 when compressed air is admitted to said cylinder. When the jaws are forced upward by this piston, as shown in Fig. 9, they fold the sheet 9 around a mandrel 23. The studs 15 on the bushings 12 are lifted at the same time with the jaws 10 and press the middle of the sheet 9 firmly against the mandrel before the jaws begin to turn up its edges, so that it cannot get out of place. The bushings and their studs are biased upward by a strong helical spring 24 abutting at one end on a cross bar of the frame, and at its other end against a collar 25 on a rod 26 projecting downwardly from the cross head 14. The tension of said spring can be adjusted by the nut 27 and lock nut 28 on a screw threaded portion of said rod. When the piston 21 drops, it opens the jaws, and when they have reached the position shown in Fig. 8, the piston exerts a downward pull on the arbor 11, which draws down the bushings and their studs away from the mandrel, putting the spring 24 under tension, ready to force the studs upwardly again when the next tube-forming operation begins.

The mandrel 23 is movable longitudinally, being supported in a guide 29 erected on the bed plate near one end of the forming jaws. The mandrel is thrust forward through said guide to its operative position over the jaws, by any suitable means, but I prefer to use compressed air, acting in a long horizontal cylinder 30 which is secured to a bracket 31 projecting from one end of the bed plate. The piston 32 in said cylinder has a rod 33 which is in line with the mandrel 23 and is attached to one end thereof. By admitting compressed air to one end or the other of said cylinder the mandrel can be pushed out or withdrawn, as desired. To insure accuracy of movement, the piston rod and the mandrel are attached to a cross head 34 which slides in parallel ways 35 fastened upon the upper side of the bracket 31. Secured to one of these ways is a curved spring 36 whose free end projects into the path of the mandrel, just in front of the guide 29, for a purpose hereinafter set forth.

Near the corners of the bed plate are four upright posts 37 which support a rectangular frame 38 whose side members form parallel guides for a carrier 39 adapted to move to and fro above and parallel with the forming jaws and mandrel 23. In this carrier is mounted the welding wheel 40, which is to travel along the line of the joint in the formed tube. Said wheel is provided with a shaft 41 journaled in bearings 42 in a rocking frame 43 which has trunnions 44 received in bearings 45 formed on the carrier. A lug 46 rises from the rocking frame, opposite to another lug 47 on the carrier, and the ends of a helical spring 48 are anchored in these two lugs, so that said spring tends to rock the rocking frame and press the welding wheel downwardly. Suitable means are provided for adjusting the tension of said spring.

Suitable means are provided for moving the carrier to and fro, consisting preferably of a cylinder 49 secured at one end to the rectangular frame 38, and containing a piston 50 whose rod 51 is secured to the carrier: the axis of the cylinder being in line with the path of movement of said carrier. At one end of the rectangular frame 38 is a stationary abutment 52 containing a socket 53 whose function is to receive, aline and support the pointed free end of the mandrel 23 when said mandrel is fed forward to its operative position over the jaws 10.

Figure 22:
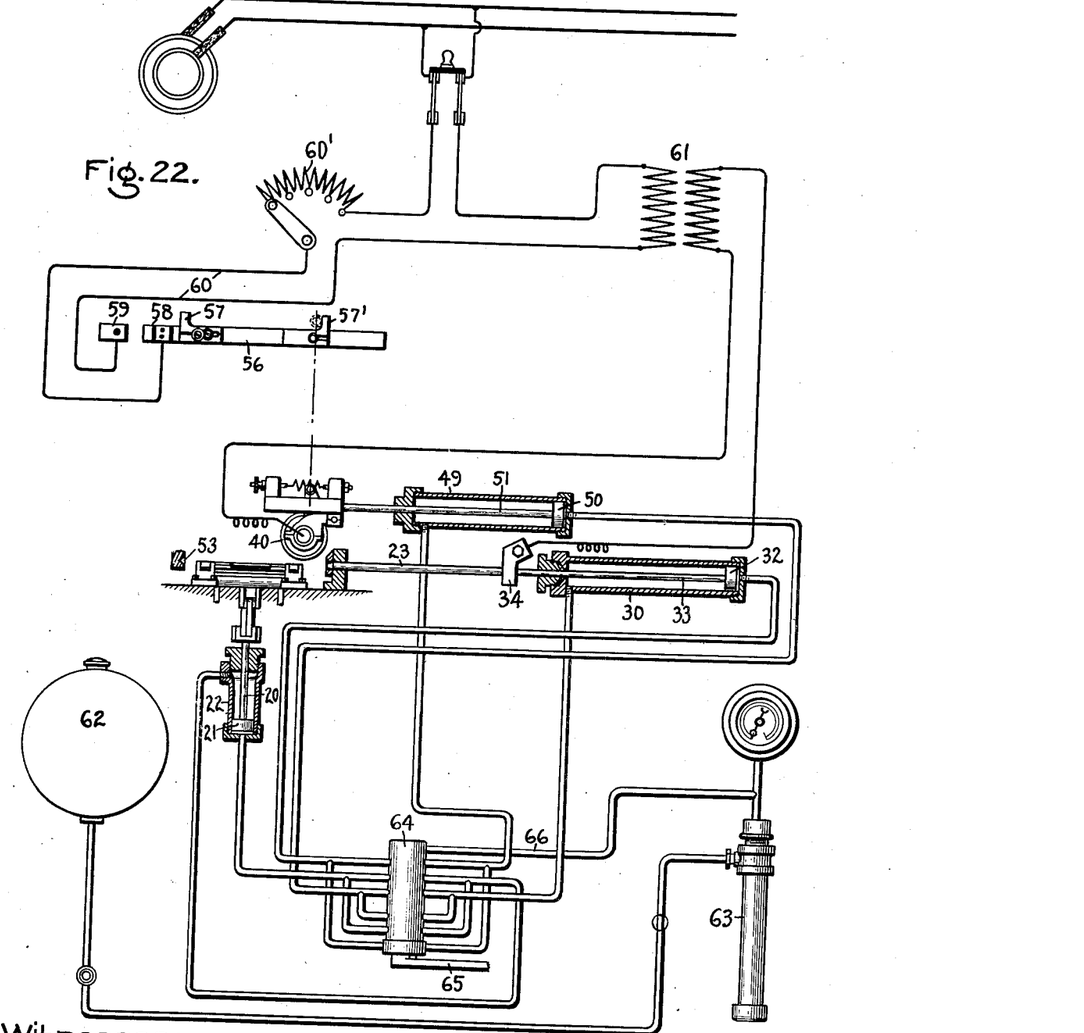
Fig. 22 is a diagram showing the air connections and electrical circuits.

In order to lift the welding wheel away from the tube at the end of its travel, two inclined planes 54 are arranged on top of the rectangular frame 38, and two laterally projecting pins 55 are attached to the rocking frame 43 which carries the wheel. When the carrier arrives at this end of its stroke, the pins ride up the inclined planes and tilt the rocking frame so as to raise the wheel. One of these pins 55 is also utilized to actuate the switch which opens and closes the electrical circuit for the welding wheel. The switch is preferably a sliding bar 56 mounted on the rectangular frame 38 and provided with adjustable tappets 57, 57' for the engagement of the pin 55. At one end said bar carries a contact 58 which coöperates with a stationary contact 59, both contacts being connected by leads 60 with a rheostat 60', shown diagrammatically in Fig. 22, and in circuit with the primary of the transformer 61. One terminal of the secondary of said transformer is connected with the mandrel 23, and the other with the shaft of the welding wheel.

Figures 15, 16, 17, 18, 19, 20, 21:
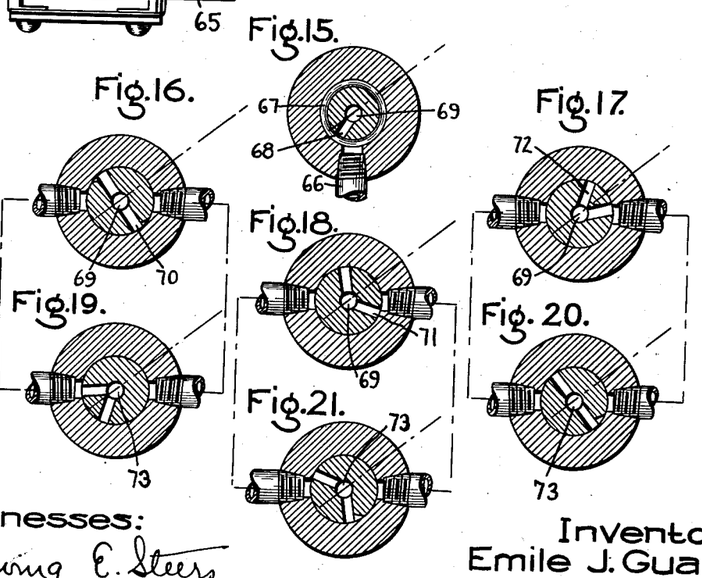
Figs. 15 to 21 inclusive are cross sections of said valve at various points, on corresponding lines in Fig. 12.

Compressed air for moving the pistons in the three cylinders is supplied from a tank 62 and passes through an oil trap 63 to a distributing valve 64. This valve is of the rotary plug type and is operated by a handle 65. The air enters through a pipe 66 to a circumferential groove 67 which communicates by a radial duct 68 with a longitudinal passage 69 in the body of the valve. From this passage lead off radial ducts 70, 71 and 72, each having two outlets in the same transverse plane, but arranged in each case at different angular distances apart, as shown in Figs. 16, 17 and 18. At diametrically opposite points in the planes of these ducts, pipes lead to the ends of the three cylinders 22, 30, and 49. Branch pipes at or near the valve connect these main pipes with ducts in the valve which at the proper time connect them with the exhaust passage 73.

In operating this machine, the blank 9 is provided with an offset lip 74 along one edge and is then placed on the plates 5 between the gages 7 and against the stop 8. Air is then admitted to the outer end of the cylinder 30 to cause its piston to feed the mandrel 23 forward over the sheet 9 and into the socket 53. A further turn of the valve exhausts air from the upper end of the cylinder 22, permitting the spring 24 to push the holding studs 15 against the sheet 9 and clamp it firmly against the mandrel. Air is then admitted below the piston 21, whose upward movement turns the jaws 10 up around the mandrel, carrying with them the blank 9, and folding the lip 74 down upon the other edge of said blank.

Figure 1:
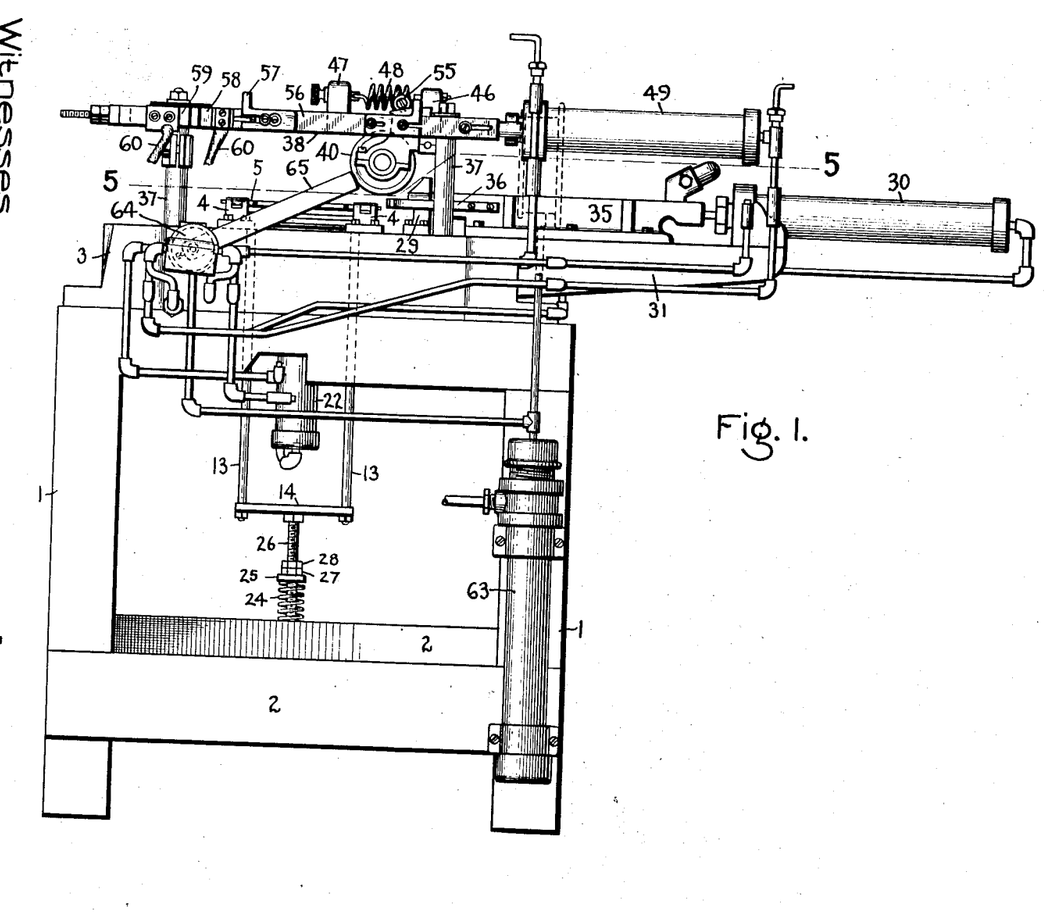
Figure 1 is a side elevation of a machine embodying my invention, the parts being shown in starting position.
Figure 2:
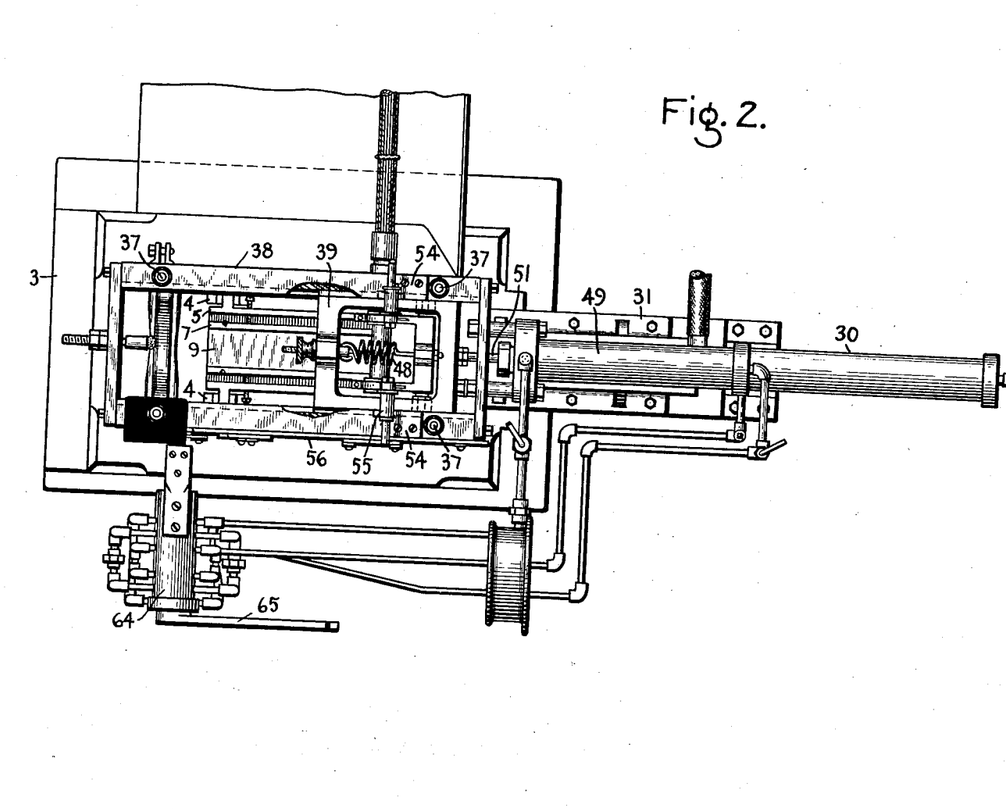
Fig. 2 is a plan view of said machine.
Figure 3:
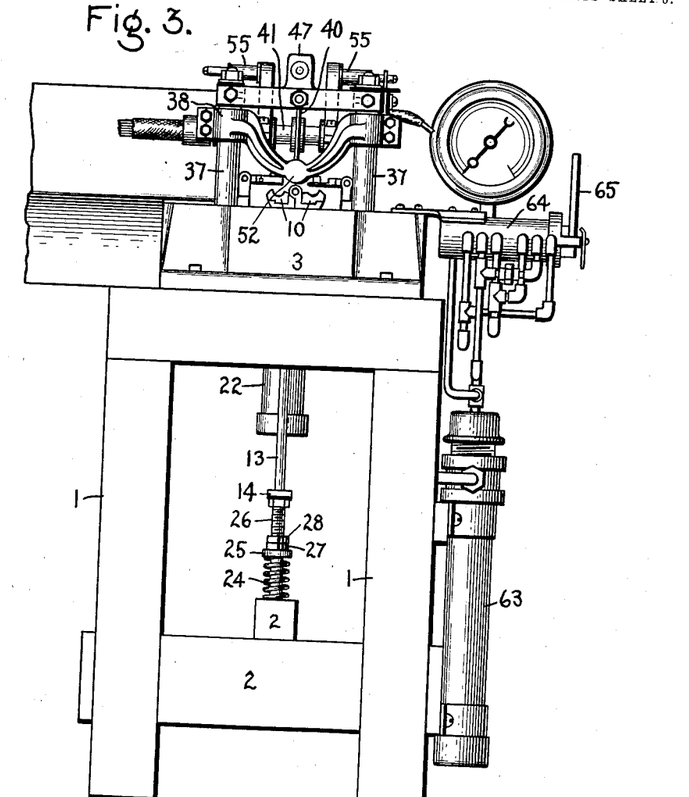
Fig. 3 is an end view.
Figure 4:
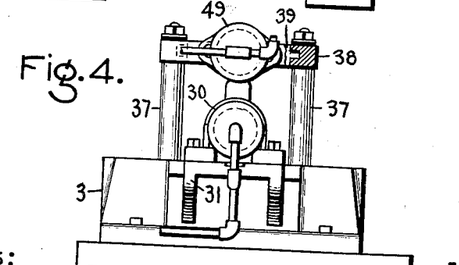
Fig. 4 is a partial view of the other end.
Figure 5:
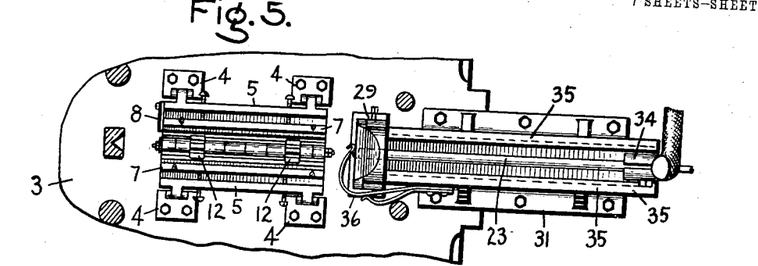
Fig. 5 is a plan view taken on the line 5—5 Fig. 1.
Figure 6:
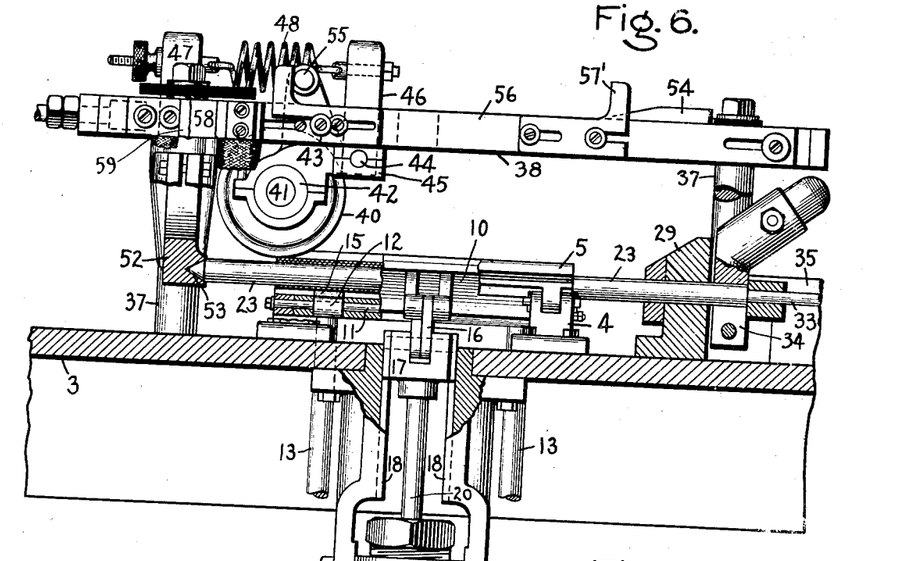
Fig. 6 is an enlarged view illustrating the tube forming and welding devices, showing the tube folded around the mandrel and the roller or welding wheel moved forward ready to begin the welding operation.
Figure 7:
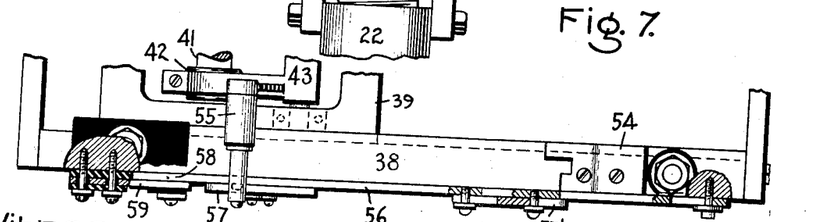
Fig. 7 is a plan view of the switch which controls the electric circuit.

The plates 5 yield upwardly, as shown in Fig. 9. A further manipulation of the valve exhausts air from the inner end of the cylinder 49 and admits it to the outer end, whereby the carrier 39 is moved to the position shown in Fig. 6. As it reaches this position, the pin 55 closes the electric switch controlling the circuit of the primary of the transformer 61. Another shift of the valve exhausts the air from the outer end of the cylinder 49 and admits it to the opposite end, thereby causing the welding wheel to traverse the joint of the tube as it lies held on the mandrel by the jaws 10. The heat of the electric current passing from the wheel to the mandrel effects a welding of the edges of the tube, which is made of quite thin material. As the wheel reaches the end of its travel, the inclined planes 54 lift it away from the tube, and the circuit is at the same time broken by the action of the pin 55 on the tappet 57' of the switch. The valve is then turned to exhaust the air from the lower end of the cylinder 29 and to admit to the other end thereof, whereby the jaws 10 are opened and the holding studs 15 are pulled down. The next move of the valve exhausts air from the outer end of the cylinder 30 and admits it to the other end thereof, whereby the mandrel is withdrawn through the guide 29 which serves to strip the tube from said mandrel. The spring 36 which has been bearing against the side of the mandrel and tube, operates to thrust the finished tube aside when the mandrel is withdrawn, so that said tube can drop into a suitable receptacle. The machine operates very rapidly, only a few seconds being required for the making of a finished tube.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. A machine for forming and making sheet metal tubes, comprising a mandrel, jaws for folding a sheet metal blank around said mandrel, a welding wheel adapted to move along the joint of said tube, means for conveying an electric current to said wheel and mandrel, and means for withdrawing the mandrel from the completed tube.

2. In a machine for making sheet metal tubes, the combination with a mandrel, of hinged jaws located below said mandrel and adapted to coöperate therewith to form a tube from a sheet metal blank, hinged plates located on each side of said mandrel to support the blank and yield upwardly when said jaws are closed, and means for electrically welding the edges of the blank while held by the said jaws.

3. In a machine for making sheet metal tubes, the combination with a mandrel, of hinged jaws located below said mandrel and adapted to coöperate therewith to form a tube from a sheet metal blank, an arbor on which said jaws are hinged, holding studs carried by said arbor, means for lifting said arbor to cause said studs to clamp the blank to the mandrel before the jaws close, and means for electrically welding the edges of the blank while held by the said jaws.

4. In a machine for making sheet metal tubes, the combination with a mandrel, of hinged jaws located below said mandrel and adapted to coöperate therewith to form a tube from a sheet metal blank, an arbor on which said jaws are hinged, bushings engaging said arbor, holding studs on said bushings, means for lifting said bushings prior to the closing of said jaws, and means for electrically welding the edges of the blank while held by the said jaws.

5. In a machine for making sheet metal tubes, the combination with a mandrel, of an arbor located below the same, bushings engaging said arbor and mounted on rods, a spring biasing said rods upward, jaws hinged on said arbor and adapted to coöperate with said mandrel to form a tube from a sheet metal blank, a cylinder and piston, links connecting said jaws with the piston rod, means for conducting compressed air to and from said cylinder, and means for electrically welding the edges of the blank while held by the said jaws.

6. In a machine for making sheet metal tubes, the combination with a mandrel, of a carrier adapted to move parallel therewith, a welding wheel mounted in said carrier, means for conveying an electric current to said wheel and mandrel, and means for raising said wheel away from said mandrel at the end of its stroke.

7. In a machine for making sheet metal tubes, the combination with a mandrel, of a carrier adapted to move parallel therewith, a welding wheel mounted in said carrier, means for conveying an electric current to said wheel and mandrel, a switch controlling said current, and means for opening said switch and raising said wheel at the end of its stroke.

8. In a machine for making sheet metal tubes, the combination with a mandrel, of a stationary frame above the same, a carrier adapted to move lengthwise of said frame, a rocking frame hinged in said carrier, a welding wheel journaled in said rocking frame, a spring urging said wheel downward, means for moving said carrier, means for withdrawing said mandrel, and a socketed abutment for the free end of said mandrel, supported on said stationary frame.

9. In a machine for making sheet metal tubes, the combination with folding jaws, of an air cylinder for operating the same, a mandrel coöperating with said jaws, an air cylinder for withdrawing said mandrel, a carrier movable above said mandrel, a welding wheel mounted in said carrier, an air cylinder for moving said carrier, and a valve controlling the admission of air to all of said cylinders.

In witness whereof, I have hereunto set my hand this 17th day of January, 1911.

EMILE J. GUAY.

Witnesses:
 JOHN A. MCMANUS, Jr.,
 CHARLES A. BARNARD.